United States Patent [19]

Pasdera

[11] 4,315,278

[45] Feb. 9, 1982

[54] APPARATUS FOR PROVIDING ERROR COMPENSATION IN A DIGITAL VIDEO RECORDING AND REPRODUCING SYSTEM

[75] Inventor: Leonard A. Pasdera, Redwood City, Calif.

[73] Assignee: Ampex Corporation, Redwood City, Calif.

[21] Appl. No.: 153,111

[22] Filed: May 23, 1980

[51] Int. Cl.³ .......................... H04N 9/39; H04N 9/491
[52] U.S. Cl. ............................................ 358/16; 358/8
[58] Field of Search ................................ 358/8, 13, 16

[56] References Cited

U.S. PATENT DOCUMENTS 3,586,762   6/1971   Hodge et al. ...................... 358/16 X Primary Examiner—Robert L. Richardson
Attorney, Agent, or Firm—Roger D. Greer; Ralph L. Mossino; Joel D. Talcott

[57] ABSTRACT

Apparatus is disclosed for providing error compensation for a digital video information signal and is particularly adapted for use with a PAL format video information signal. The apparatus takes advantage of sampling being done in a precise manner, i.e., at a rate of four times the chrominance subcarrier frequency of the PAL information signal, and alternately along the U and V vector axes. The apparatus generates a substitute value for a defective sample that is the average of selected samples which are in close proximity to and which are of the same type as the defective sample. More particularly, replacement samples taken along the U vector axis (U samples) are generated by averaging the nearest in proximity U samples and the replacement V samples are obtained by averaging the nearest in proximity V samples. Switching means appropriately substitute the generated values for the defective values so that V samples replace V defective samples and U samples replace defective U samples.

13 Claims, 17 Drawing Figures

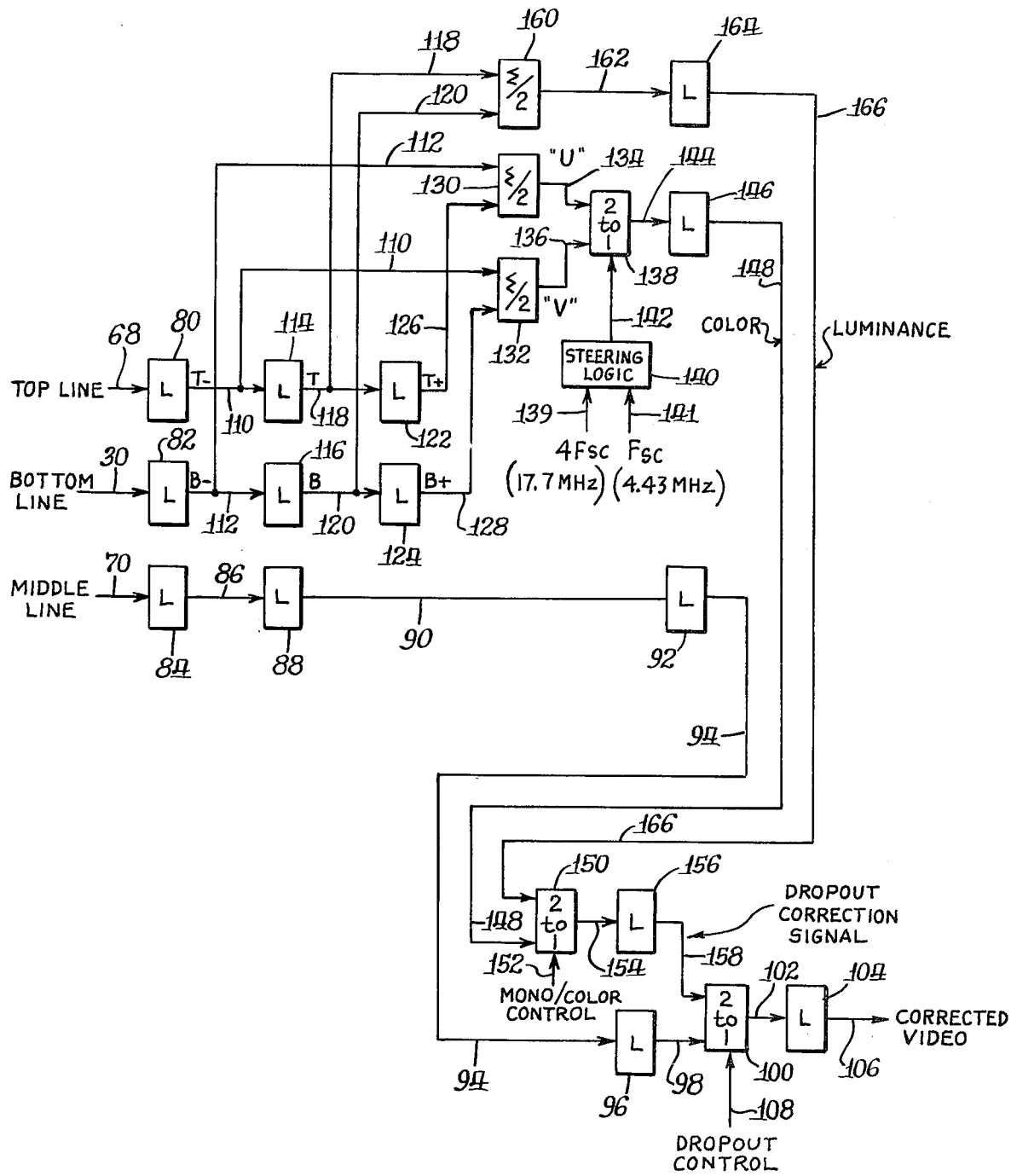

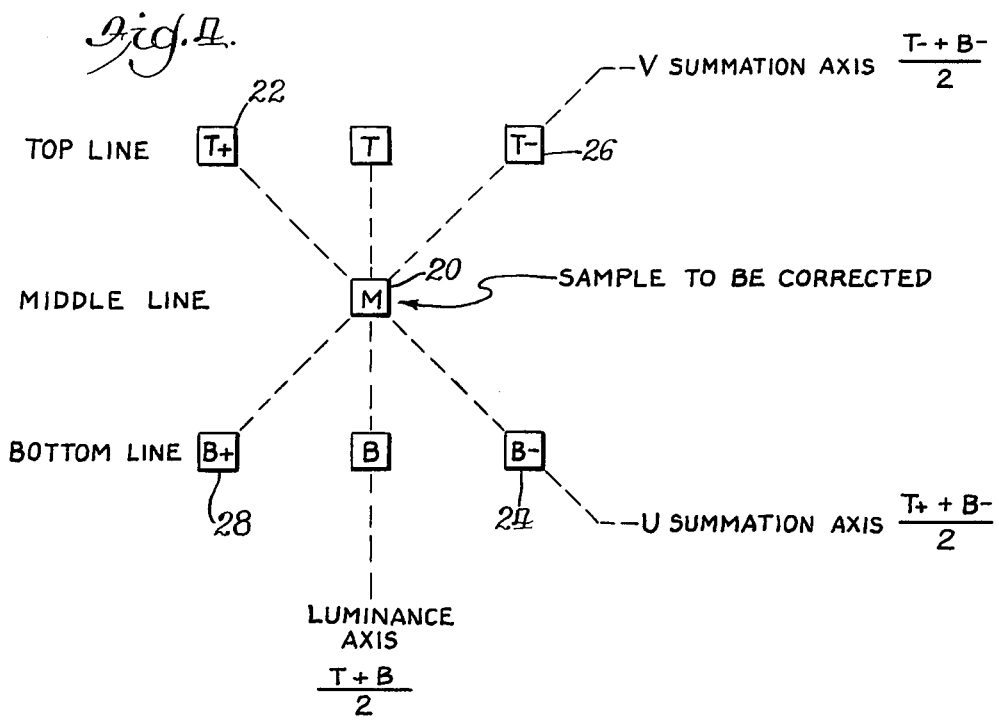
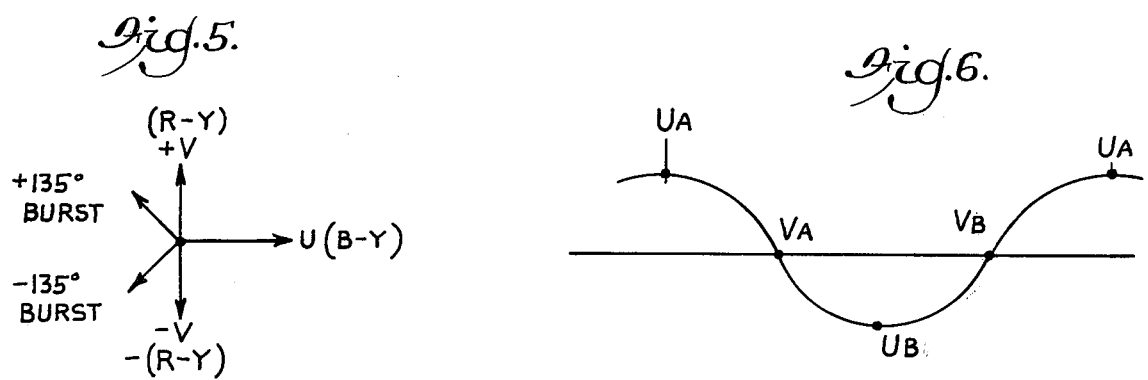
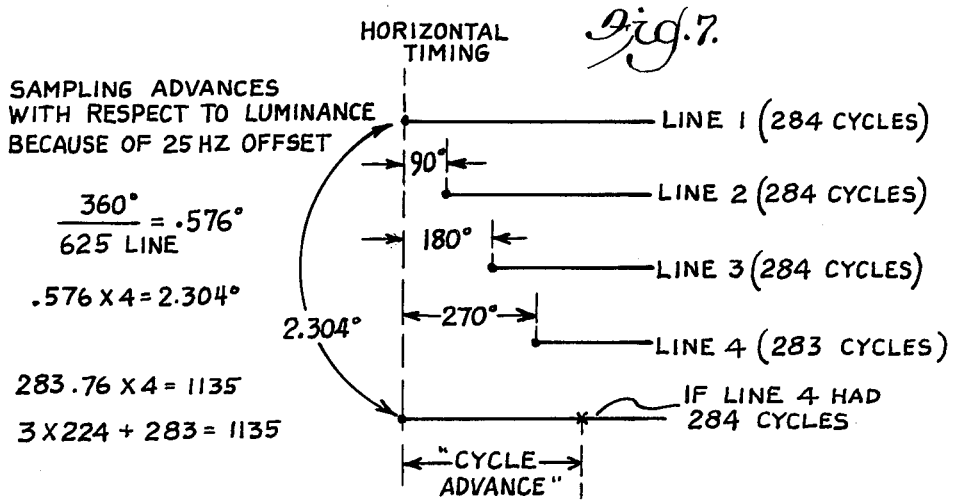

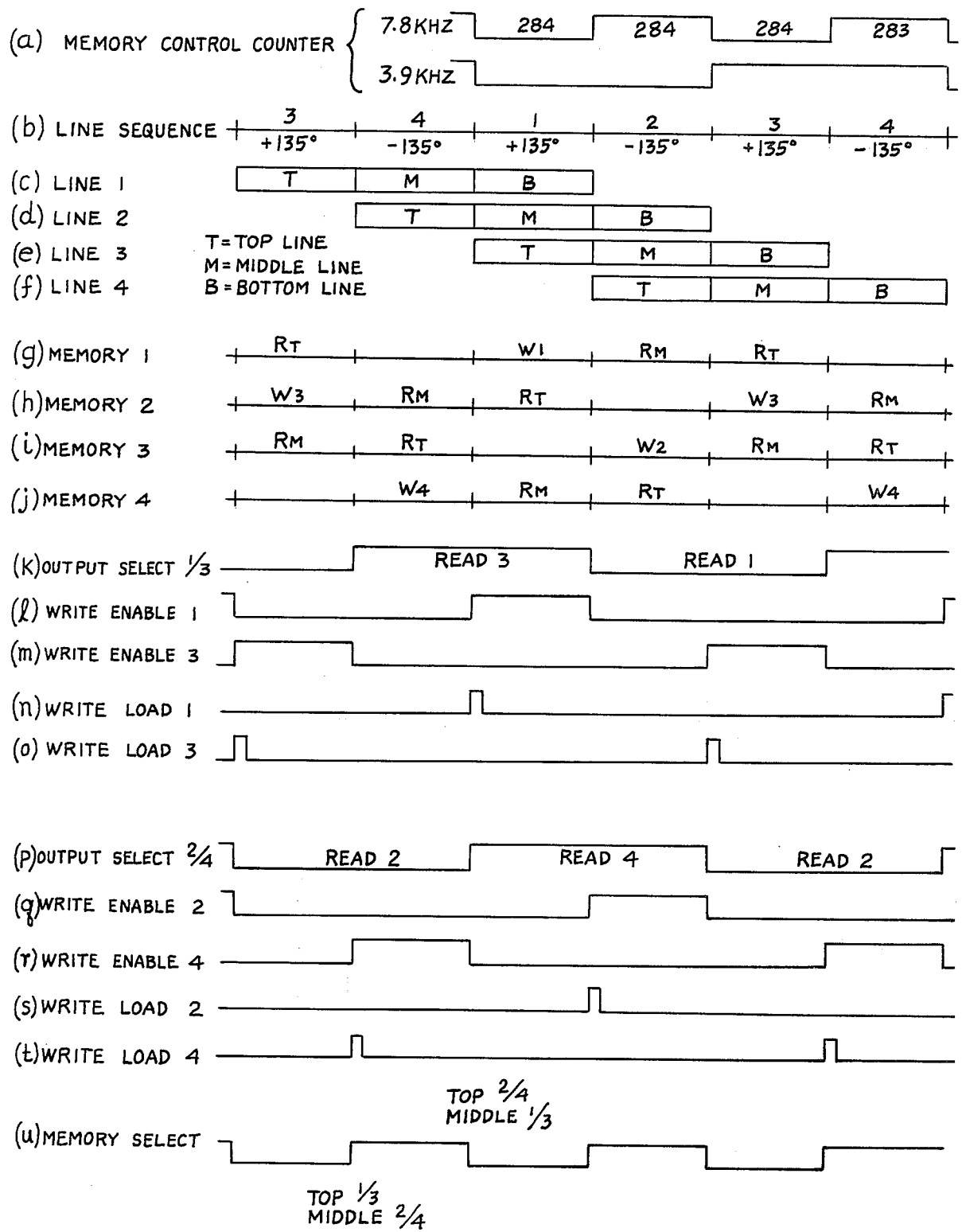

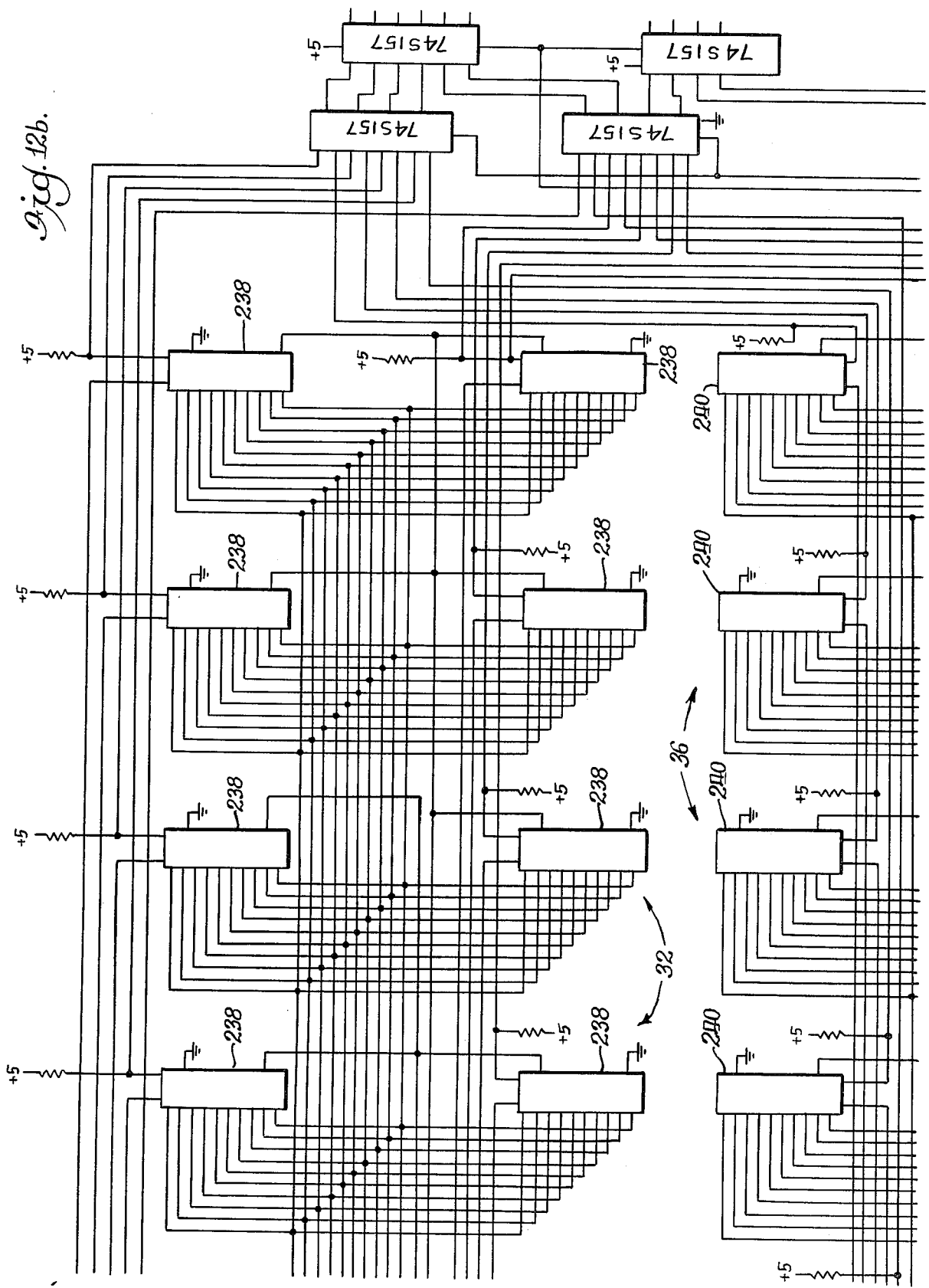

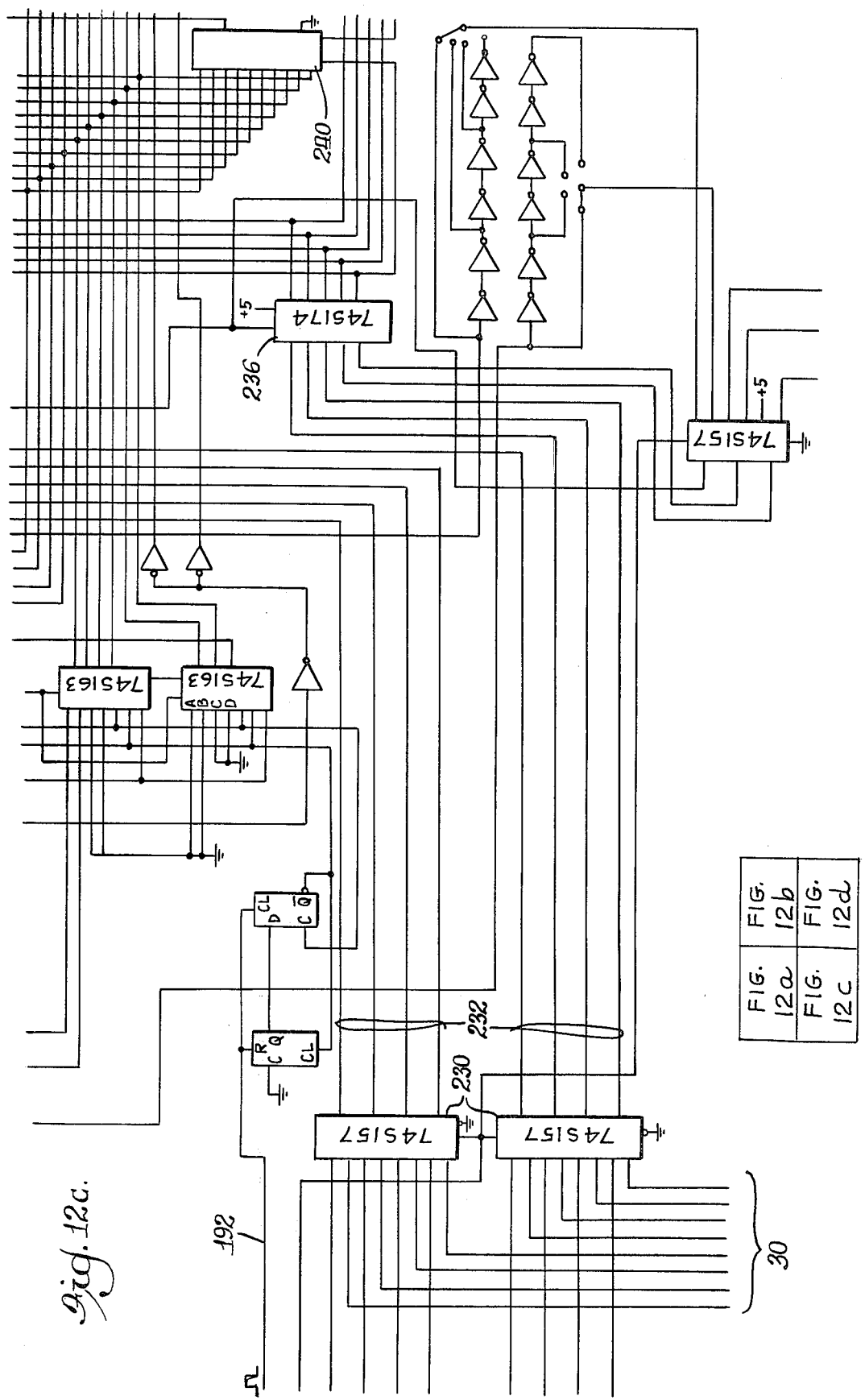

APPARATUS FOR PROVIDING ERROR COMPENSATION IN A DIGITAL VIDEO RECORDING AND REPRODUCING SYSTEM

BACKGROUND OF THE INVENTION

The present invention generally relates to drop-out and/or error compensation apparatus, and more particularly, to apparatus for providing such compensation in a digital data stream of a PAL format video information signal.

The present invention is intended for use with a video recording and reproducing apparatus such as a magnetic tape recording and reproducing apparatus, although other types of recording and reproducing apparatus may advantageously incorporate the present invention as will be apparent from the following description. The present invention effectively corrects picture impairments that are caused by unsuccessful recovery of data upon reproducing, from digital video recorders and particularly digital video magnetic recorders. At the present time, FM video recorders which use digital time base correcting apparatus during the playback of the recorded signal are limited to using direct replacement information from previous horizontal video lines to correct what are commonly referred to as drop-outs, wherein an imperfection in the magnetic tape or other problem results in the loss of the signal during reproducing for very short intervals. When the replacement information from the previous lines are used to substitute values for current video information that is defective or missing, the use of the replacement information from previous horizontal video lines leads to timing displacements due to the fact that the correction signal is not derived from the close proximity spatial information around the point of interest that is to be corrected.

More recent research and development has been directed toward digital recorders which does not employ FM recording, but in fact records digital words that represent samples that were taken of the analog video information signal. The digital words are recorded and reproduced and subsequently converted to analog signals. There are significant advantages in recording digital signals as opposed to FM recording. Among the advantages are the fact that during playback or recording, the video signal is not degraded by head-to-tape spacing losses, Moire, noise and velocity errors. As will be evident from the description of the present invention, the digital signals permit correction to be accurately generated by arithmatic means from the preceding line, i.e., the line above the line of interest, and the succeeding line, i.e., the video line below the point to be corrected. This close proximity spatial information around the point or digital word that is to be corrected significantly improves the positional timing of the correction signal.

Another inherent advantage of digital video recording and reproducing apparatus is that the sampling of the analog signal can be done at a precise phase relationship that is desired and is done before recording. Because the phase relationship is set during sampling and before recording, it will not be changed during playback by the presence of any velocity errors. The present invention is particularly adapted for use with a PAL format television signal which has a chrominance subcarrier at a frequency of approximately 4.43 MHz as well as the other characteristics of the PAL signal, including the presence of the U and V components which are used to advantage by the present invention. More particularly, the present invention utilizes a sampling rate of the PAL video signal at four times the subcarrier frequency of 4.43 MHz, which is a 17.7 MHz sampling rate. Also of significant importance is the fact that the samples are alternately taken along the U and V component vector axes so that for each subcarrier cycle, there are two U samples and two V samples. The sampling is done so that only the U component is sampled for two of the samples and only the V component is sampled for the other two samples for each subcarrier cycle and the absence of any V component for the U samples as well as the converse is used to advantage in generating a substituted value for the samples, as may be necessary if the data recovered during playback is either defective or missing.

By utilizing the sample values in closest proximity to the point that is to be corrected, the probability of obtaining a substitute value that is closest to the value of the point which is to be corrected or compensated for is increased. Whereas other compensation schemes have substituted a value that may have occurred at the same location from the immediately preceding subcarrier cycle, for example, or from the corresponding location from a preceding line or even from the same location of the same line from a preceding field, all of these schemes can produce a relatively incorrect value for the defective point that is to be compensated for, depending upon the particular content of the video image at the time as well as the movement that is occurring from field to field. Thus, if a point that is to be corrected was in a particularly dark portion of the image and if movement from dark to light has occurred for that point from the prior field to the present field, then a dark value will be substituted for the defective point even though the defective point should have been light by virtue of the movement having occurred in the image. Similarly, if a preceding cycle or preceding line is particularly close to a significant change in contrast or color, then the substitution of that value for the point to be corrected may result in an incorrect value being substituted for the defective point. It should also be understood that if the values that are to be substituted for current defective values are provided from a previous field, then it is necessary for a memory to be utilized that can store the data values for a complete field, which necessarily requires a memory of substantial capacity, particularly if the digital samples are comprised of eight bit words.

Accordingly, it is an object of the present invention to provide an improved apparatus for compensating for errors during recovery of data words of a video information signal, which apparatus has a high probability of generating an accurate replacement value for a defective word.

Another object of the present invention is to provide an apparatus for performing error correction which provides an accurate value for substitution of a defective value, and which does not require a memory of substantial capacity, it only requiring a capacity for storing data words for three horizontal video lines.

Another object of the present invention is to provide an apparatus for compensating for missing or defective data of the foregoing type, which utilizes an averaging technique utilizing similar types of samples from immediately adjacent samples in immediately adjacent horizontal video lines to thereby provide an average value that has a high probability of being accurate, notwithstanding significant movement in the video image or the presence of a distinct color or intensity contrast very close to the point which is being corrected.

Other objects and advantages will become apparent upon reading the following detailed description, while referring to the attached drawings, in which:

FIG. 2 is a functional block diagram of the remaining portion of the apparatus embodying the present invention which is not specifically shown in FIG. 1, and particularly illustrating the apparatus that generates the substitute values for defective samples that are to be corrected;

FIG. 4 is a drawing illustrating a portion of samples of the type shown in FIG. 3, and particularly illustrating the sample to be corrected, together with other samples from adjacent lines, all of which are useful in explaining the nature of the operation of the apparatus of the present invention;

FIG. 5 is a chart illustrating the various vector components, together with the color burst component of a PAL format television signal;

FIG. 6 is a sine wave of a color which is comprised of entirely U component and no V component in a PAL format television signal and which shows four samples having been taken during a cycle of the chrominance subcarrier and is provided to provide a greater understanding of the present invention;

FIG. 7 is a chart illustrating the manner in which sampling is accomplished for successive horizontal video lines in a PAL format television signal and particularly illustrating the effect of the 25 Hz offset upon the horizontal timing and luminance that is present in the PAL format television signal;

Figure 1:
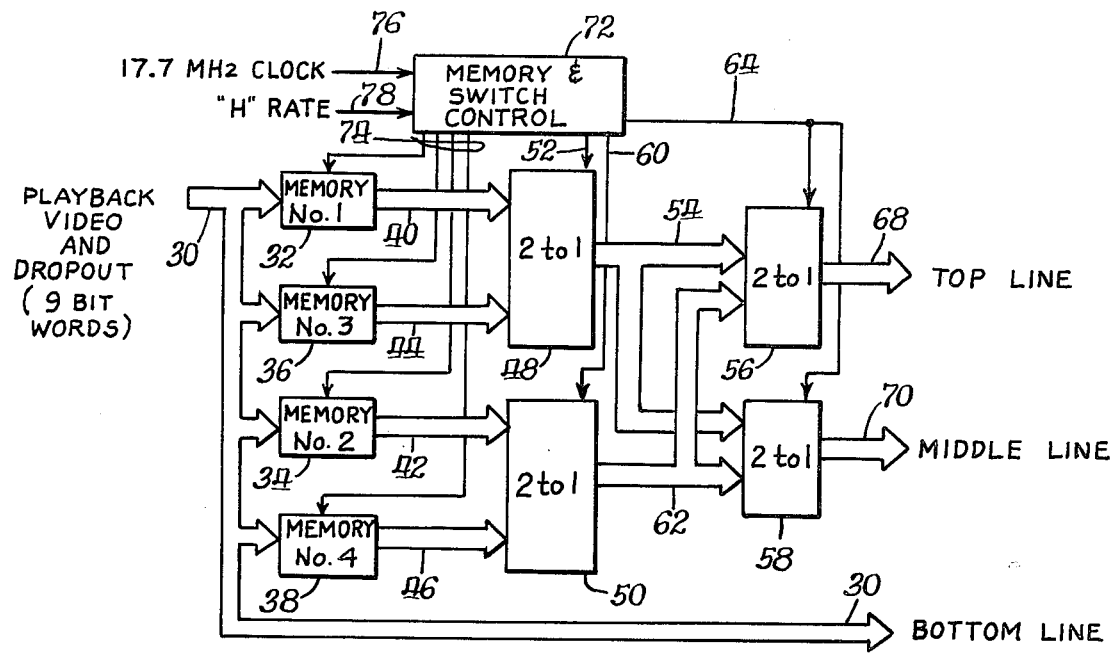
FIG. 1 is a functional block diagram of a portion of the apparatus embodying the present invention, and particularly illustrating the memory and switching circuitry for providing three consecutive horizontal video lines of digital information.
Figure 9:
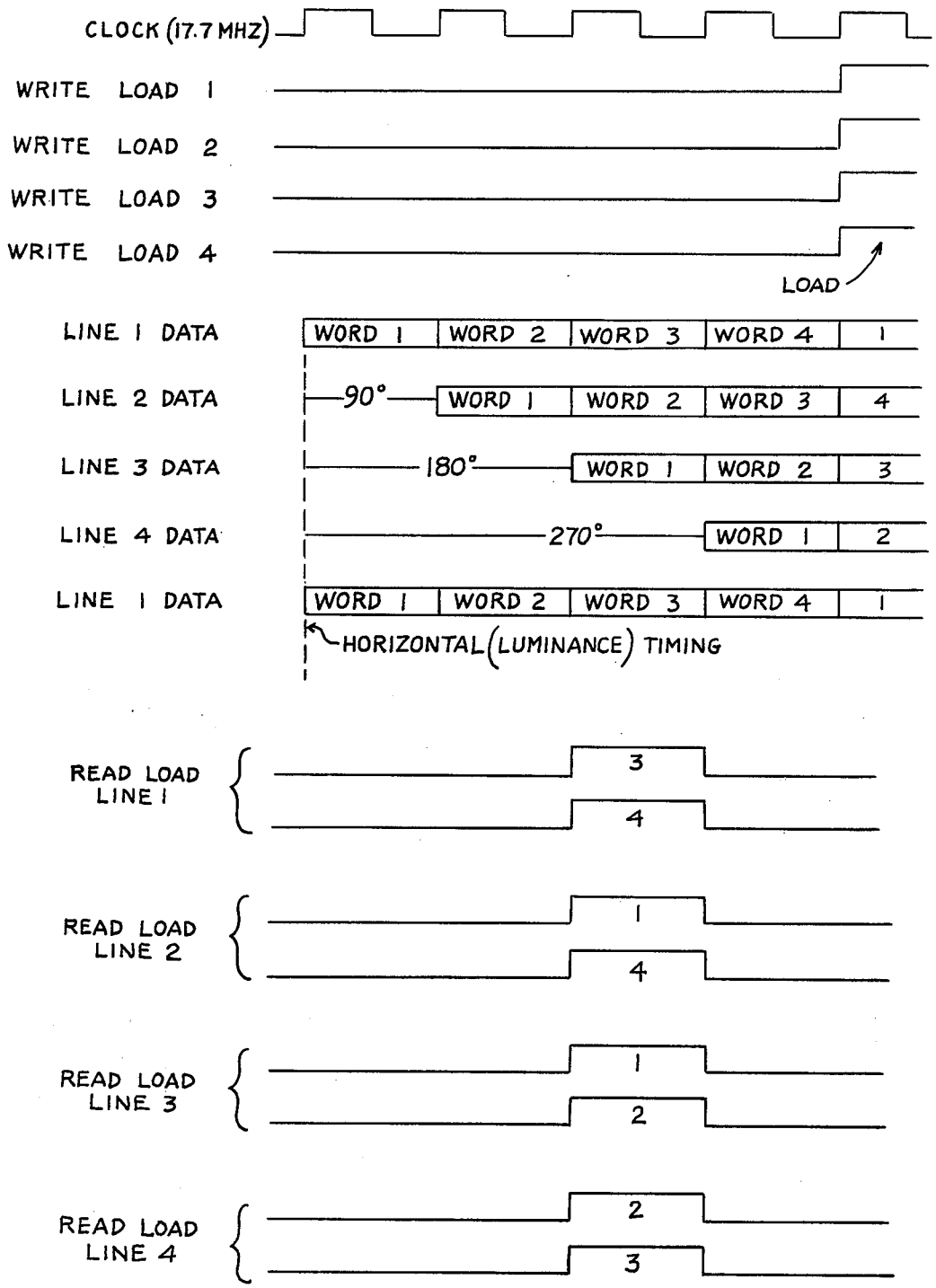
Figure 10A:
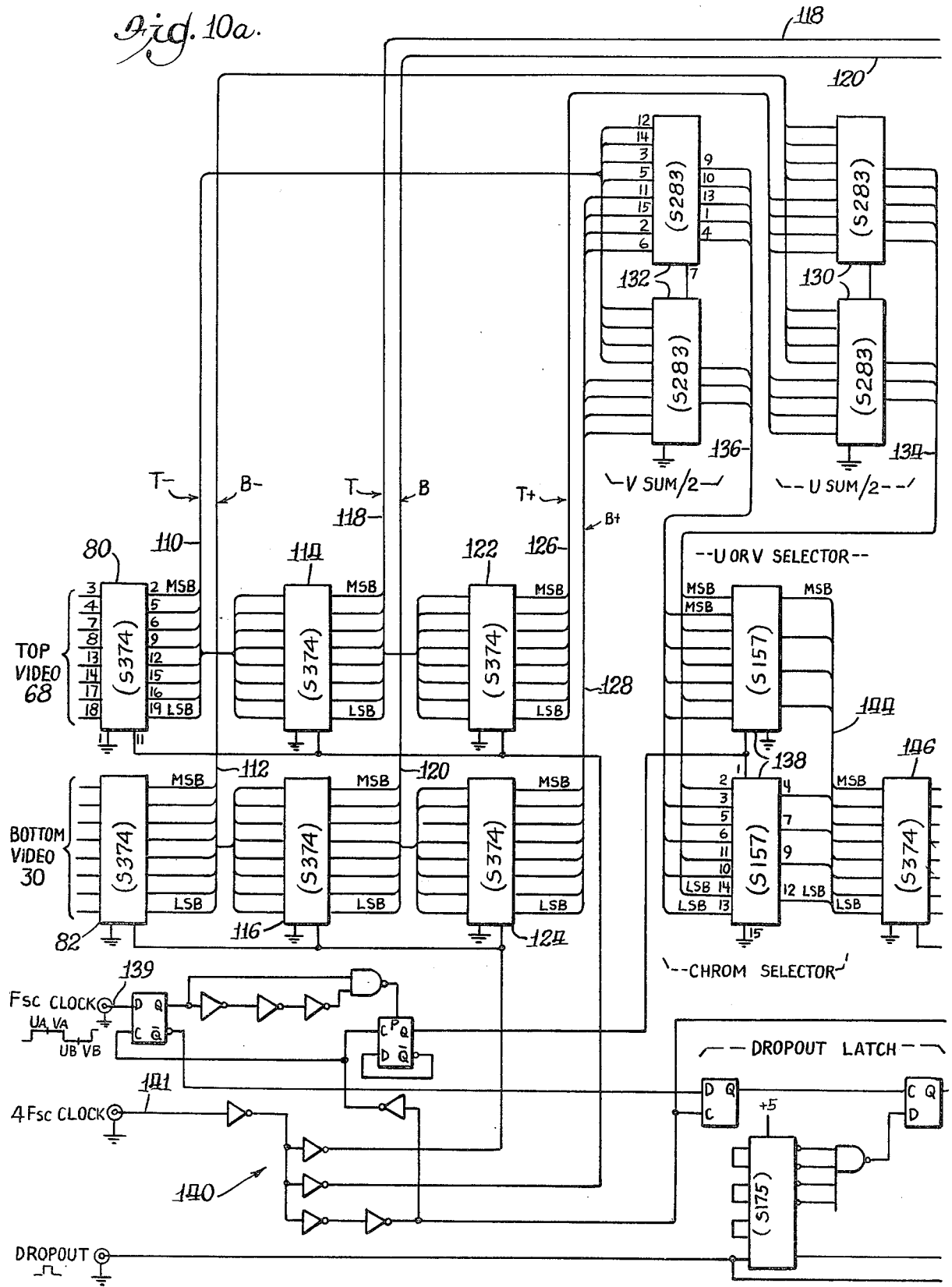
Figure 10B:
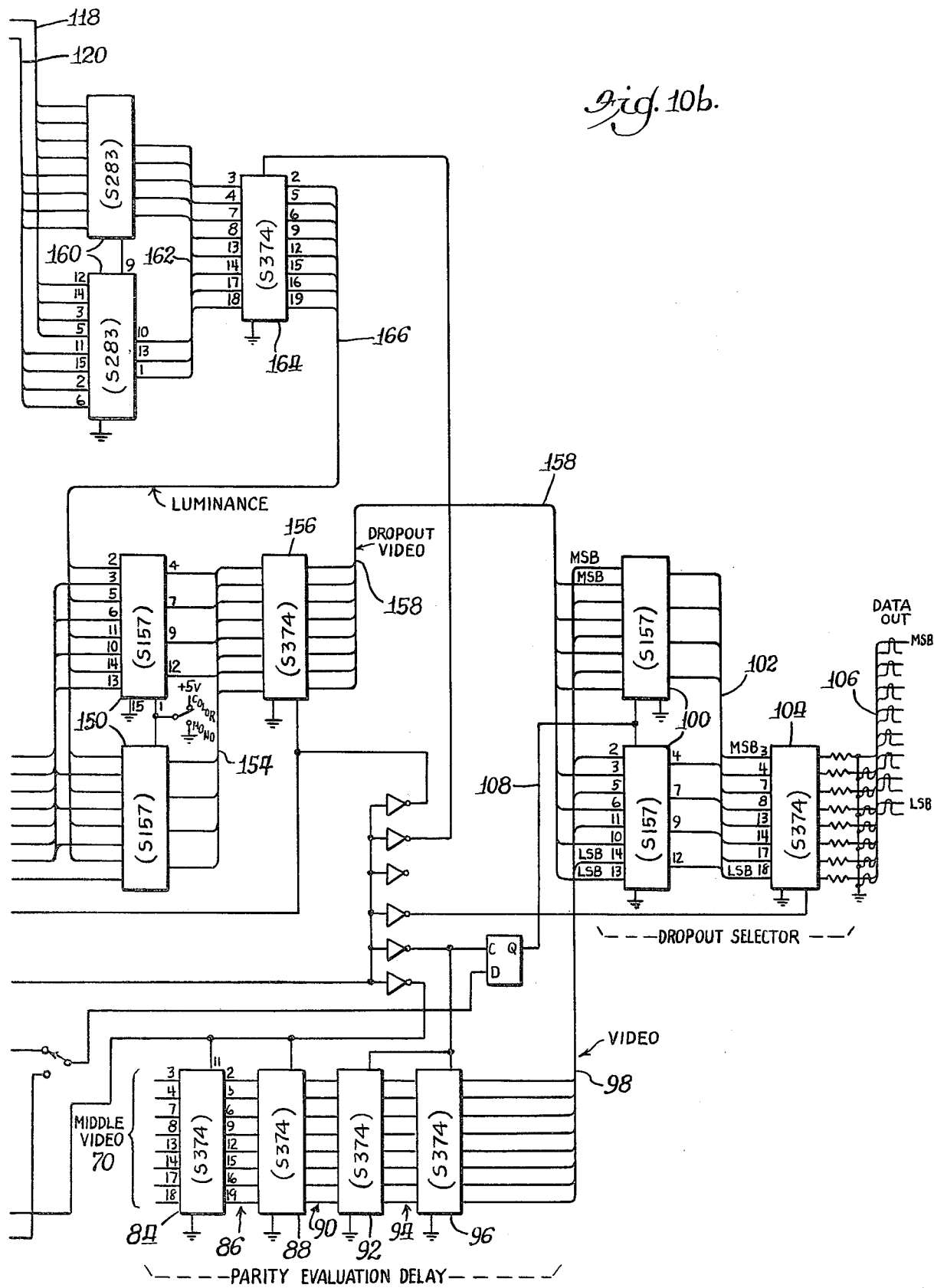
Figure 11A:
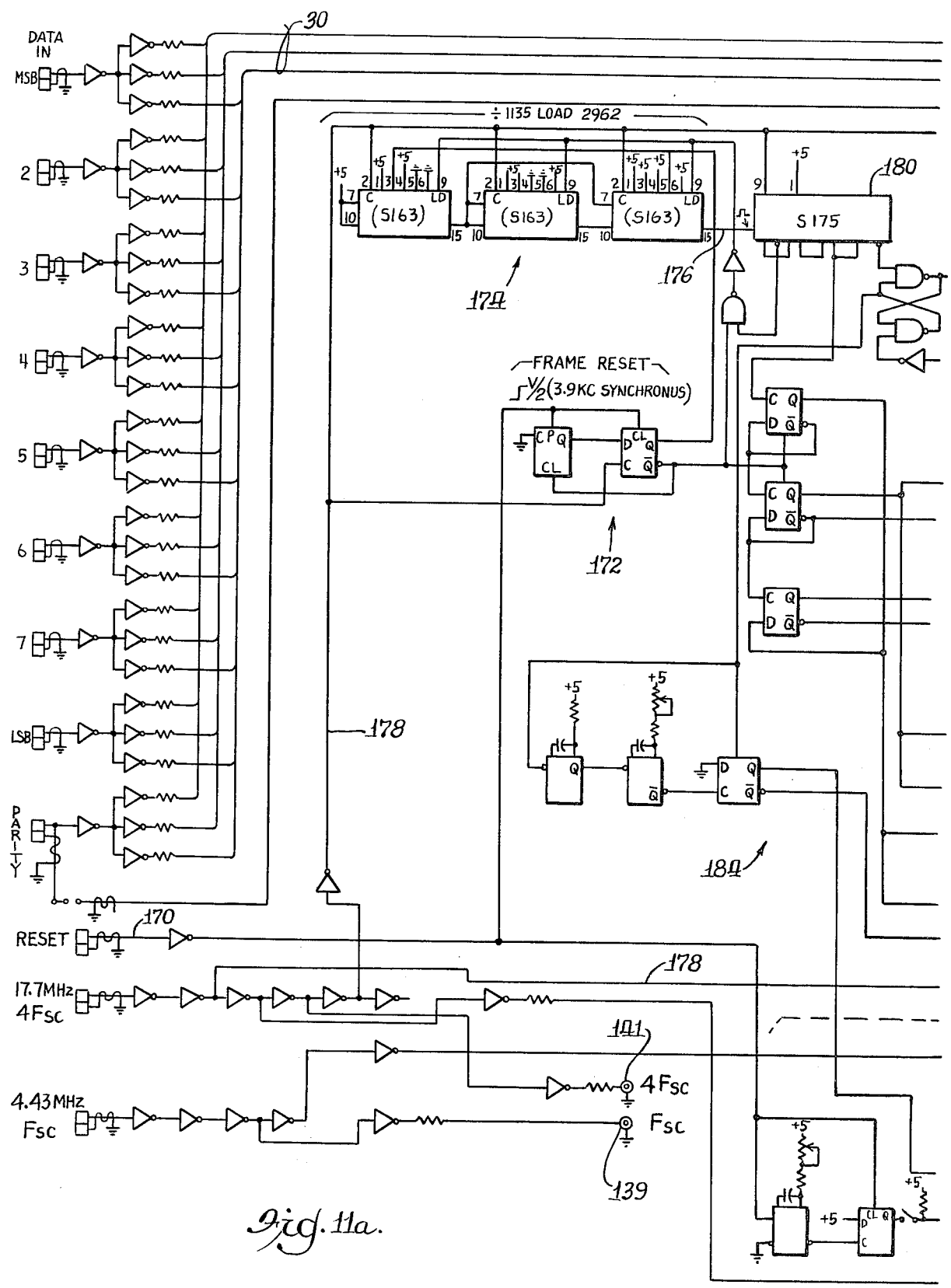
Figure 11B:
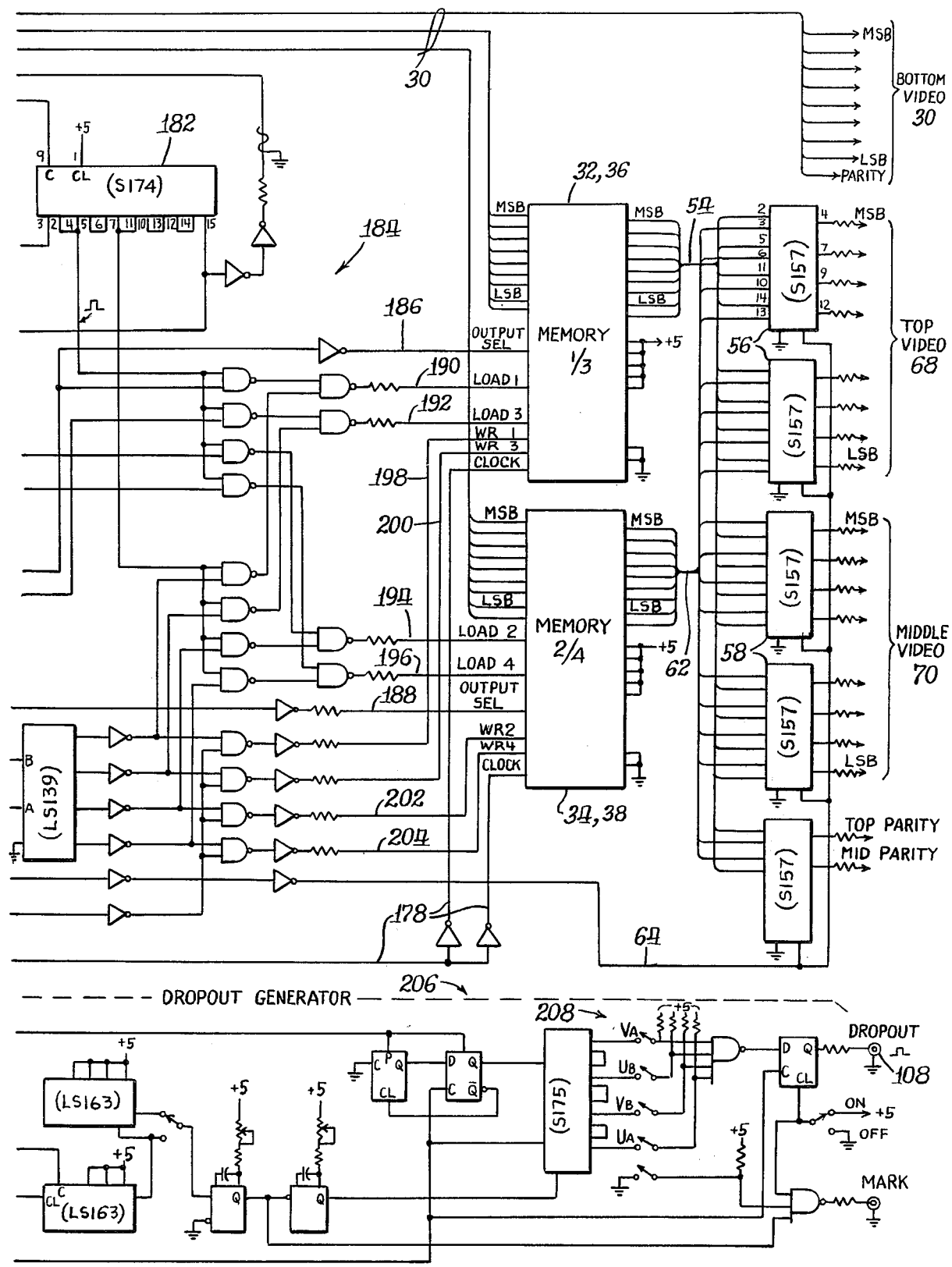

FIGS. 8 and 9 together illustrate the timing and control diagrams for operating the specific circuitry that is shown in FIGS. 10, 11 and 12;

FIGS. 10a and 10b together comprise an electrical schematic diagram of specific circuitry that can be used to carry out the operation of the block diagram shown in FIG. 2;

FIGS. 11a and 11b together comprise an electrical schematic diagram of specific circuitry that can be used to carry out the operation of the block diagram shown in FIG. 1; and, FIGS. 12a to 12d together comprise an electrical schematic diagram of the memory circuitry shown in FIGS. 1 and 11b.

DETAILED DESCRIPTION OF THE APPARATUS

The present invention is one which provides correction or compensation for digital data words that have been lost or which have been otherwise impaired during the recovery of data through an information channel or upon reproduction after having been recorded by a recording and reproducing system. The apparatus utilizes data words corresponding to specific samples of a video information signal to generate a value that can be substituted for the defective or missing data words in a data stream of data words that represent samples taken from an analog video information signal. A particular desirable attribute of the present system is that it utilizes valid data words in very close proximity to the missing or defective data word for the purpose of generating a value that can be substituted for the defective data word. An accurate substitute value can be generated for the defective word, because the data words that are used to generate the substitute value are in close spatial relation or proximity to the defective data word relative to the actual video image that the digital data words represent. However, even though the data words that are used to generate the substitute value are physically close to the defective data word, they are not close in actual time or proximity along the data stream containing the data words that are used to generate the substitute value.

Prior to describing the nature of the operation of the apparatus of the present invention, which is shown in the functional block diagrams of FIGS. 1 and 2, it is useful to describe the important features of the PAL format video information signal and the nature of the sampling of it, particularly as applied in the present invention. Thus, reference will initially be made to FIGS. 3-7 which illustrate the spatial relationship of the samples as well as the vector diagram for a PAL television format (FIG. 5) and the timing relationship between sample data words and the unique characteristics of the PAL format television signal, particularly with respect to the 25 Hz offset that occurs with respect to the luminance component from line to line.

Turning initially to FIG. 5, a vector diagram is shown which illustrates the phase relationship between the U component which is shown being directed toward the right, the V component and its relationship to the color burst of the chrominance subcarrier of the PAL format television signal. Although the U component is maintained constant, the phase relationship of the V component alternates from $+V$ as is shown in FIG. 5 to $-V$ on every successive horizontal line, i.e., the phase of the V component is reversed every line in the PAL format television signal. Similarly, the phase of the burst which is shown to be either $-135°$ or $-135°$ relative to the U component also alternates between these two positions on successive television lines. It should again be emphasized that the analog video information signal of the PAL format television signal is sampled at a rate of four times the frequency of the chrominance subcarrier which is approximately 4.43 MHz so that the sampling is accomplished at a rate of 17.7 MHz and it is assumed that the input signal from video playback, for example in FIG. 1, is a data stream of eight bit data words plus one parity bit which comprises the data stream of the sampled PAL signal.

If a color signal having only a U component is present, such as is shown in FIG. 6 at a frequency identical to the color subcarrier frequency, then there would be four samples taken of this signal during a subcarrier cycle and these four samples are defined as the $U_a$, $V_a$, $U_b$, $V_b$ samples as shown. Since the particular signal has only U component therein, the $V_a$ and $V_b$ samples are zero as shown, and the $U_a$ and $U_b$ samples are at the respective positive and negative peaks of the sine wave. Thus, in FIG. 3, portions of four consecutive or successive horizontal video lines are shown with the $U_a$, $V_a$, $U_b$ and $V_b$ samples being present in each of the lines. As shown at the left of the horizontal lines of samples, the burst component alternates between $+135°$ and $-135°$ for successive lines. Also, the prime (') designation for the various V samples are intended to denote that they are of opposite phase relative to the unprimed V samples. Referring again to FIG. 3, a $U_a$ sample is shown in the upper left corner of the first line and a similar $U_a$ sample in the next line is one location to the right and this stepping to the right occurs for each successive line. It is noted that this is due to the inherent characteristic of the PAL signal when the signal is sampled at a four times subcarrier rate and is also sampled only along the U and V axes. The sampling rate of four times subcarrier is essentially aligned with the luminance of the signal since the rate is a whole number multiple of the line rate. In the PAL format, the rate is 1135 times the line rate plus 25 Hz. The 25 Hz offset merely means that the luminance component is incorrect in the amount of 0.576° for each line which is subjectively insignificant in the picture. Since the sampling that is accomplished in the present invention samples the U and V components by averaging the preceding and succeeding in time samples from the respective top or bottom lines, as best shown in FIG. 4, the luminance is an inherent part in the average and is not separately calculated or derived with the present invention. By viewing FIG. 4, it is seen that the luminance axis is vertically aligned and would be generated for a sample by merely averaging the samples immediately above and below the sample if it were to be separately generated.

Figure 3:
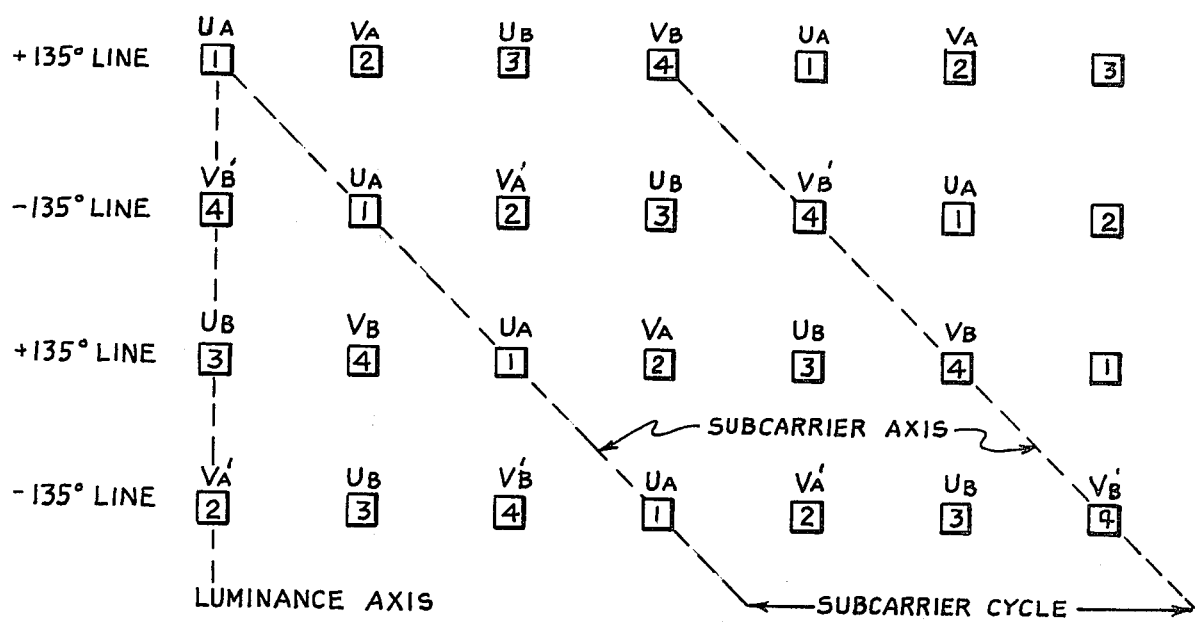
FIG. 3 is a drawing illustrating respective U and V samples for portions of four consecutive horizontal video lines of a PAL format television signal.

Referring to FIG. 7, the horizontal timimg must be accurately maintained so that the relative positions of the samples as shown in FIG. 3 will be maintained and the apparatus will be operative on the appropriate samples to obtain the correct substitute values. For example, in the FIG. 3 illustration, when sampling the PAL signal with a phase continuous four times subcarrier sampling signal, it is seen that the $U_a$ sample will be stepped to the right for each succeeding line and each $U_a$ will be followed by a $V_a$ sample and the other samples will be appropriately positioned. Each horizontal line of a PAL signal has a duration corresponding to 283.75 cycles of subcarrier. Thus, in FIG. 7, it is seen that such sampling results in a shifting to the right of the $U_a$ as well as all of the other samples from line to line by an amount corresponding to ¼ cycle of the subcarrier. This results in the illustrated 90° shift of the samples for each successive line. At the end of every fourth horizontal line, four 90° shifts will have occurred, hence, a full 360° phase shift of the $U_a$ and following samples. Since the operation and control of the memory means are done through clocks that are related to subcarrier frequency, it is desired to perform a cycle advance every fourth line to avoid unwanted shifts in horizontal timing of the signals retrieved from the memory. Thus, FIG. 7 shows a horizontal timing vertical line and the control of the memory is such that there are 284 cycles counted for each of the first three lines and to compensate for the accumulated full cycle phase shift at the end of the fourth line, a 283 cycle reset is utilized to regain the proper horizontal timing as is desired. It should be understood that the sampling of the PAL video information signal is done at a four times subcarrier frequency that is constant, precise and unchanging in its phase relation, i.e., there are samples alternately taken along the U and V axes in a manner which does not change with respect to phase from line to line or field to field. Thus, the sampling that is done of the PAL signal results in the illustrated relationship of the samples relative to one another and relative to succeeding lines as shown in the diagram of FIG. 3 and these samples are used by the apparatus to generate a substitute sample for insertion into the data stream for those samples which are determined to be defective or missing by virtue of a parity check or drop-out determining circuit.

The apparatus of the present invention has memories into which three successive horizontal video lines of data words are written so that the data is available for generating the substitute values in the manner that will be hereinafter described. Turning now to FIG. 4, there is shown a sample to be corrected which is shown at 20 as being located in the middle line with an immediately preceding in time line being shown as the bottom line and an immediately succeeding in time horizontal video line shown as the top line. It should be appreciated that the sample 20 to be corrected may be any sample in any line and it is only necessary for the top and bottom lines immediately adjacent the middle line to be present to perform the necessary operations to derive a substitute value for the sample to be corrected.

It should also be understood that the sample 20 to be corrected may be a sample taken along the U axis or it may be a sample taken along the V axis, this being more readily understood by viewing the spatial relationship of the samples identified in FIG. 3. If the sample 20 to be corrected is a sample that was taken along the U axis, then the sample value is derived by averaging the immediately preceding in time sample from the succeeding line, i.e., sample 22, with the immediately succeeding sample from the immediately preceding line, i.e., sample 24. A straight summation and divide by two arithmetic operation is performed with respect to these two samples and an average value which can be substituted for the sample to be corrected, i.e., sample 20, is thereby accomplished. If the sample to be corrected is one which was sampled along the V axis, then a slightly different but similar operation is accomplished and averaging is done by averaging the immediately succeeding sample from the succeeding line, i.e., sample 26, is averaged with the immediately preceding sample from the preceding line, i.e., sample 28, and the average value derived from these two samples is then substituted in the sample location that is to be corrected. It can also be appreciated that the samples corresponding to U samples are not phase inverted between consecutive lines and thus the generation of the substitute samples for the sample 20 occurs along the U axis, i.e., along the line extending between samples 22 and 24. However, the V samples are phase inverted between consecutive lines and since correction information is made from the lines immediately preceding and succeeding the line in which the sample to be corrected is located, the correction signal for the V samples must be effectively chroma inverted and the inversion can be simply incremented by rotating the V summation axis, i.e., the axis along the line through the samples 28, 20 and 26 are shown in FIG. 4 thus not requiring chroma separation and inversion.

Before describing the apparatus which can accomplish the averaging that has been described with respect to FIG. 4 which illustrates the sample from the top, middle and bottom lines that have been identified by the numbers 20 through 28, reference is made to the fact that these samples that are identified by the reference numbers also carry the designations T+, T—, B+ and B— and these designations are carried through in the functional block diagrams of FIG. 2, as well as in the actual schematics that carry out the operation of the functional block diagrams. Thus, sample 22 is also identified as T+ which means it is the sample from the top line that is ahead in time relative to the sample to be corrected, i.e., sample 20, which is also identified as sample M in FIG. 4, and the sample identified at T is the sample that occurs at the same time in the top line as the sample 20. Similarly, sample 26 is also identified as T—, and designates the sample immediately following the sample T which is one sample later in time than the sample 20 to be corrected. Similarly, sample 28 is identified as B+, which means it is one sample ahead in time relative to the sample B which occurs at the same time as the sample 20 in the middle line and sample 24 is also identified as B— which indicates that it is the sample immediately following or behind in time relative to the sample B.

Since it is quite apparent that it is necessary for there to be data representing three successive video lines to be present simultaneously for operation of the apparatus of the present invention, it is necessary for the apparatus to include sufficient memory to store at least three lines of data samples so that the various operations can be accomplished with respect to the generation of the substitute or corrected values that are to be inserted into the data stream for a defective or missing sample. The apparatus of the present invention is shown in the block diagrams of FIGS. 1 and 2, the FIG. 1 diagram illustrating the memory and switching that is used to provide the top, middle and bottom line information that the apparatus shown in the functional block diagram of FIG. 2 uses to generate the corrected values for insertion into the data stream of video information.

Turning initially to FIG. 1, the eight bits per data word of active video information which are actually provided on eight separate lines are shown as input line 30 and line 30 extends to each of four separate memories 32, 34, 36 and 38, which respectively identify memories 1 through 4. The input line 30 also extends directly to the right to provide the bottom line information at any particular time, since it is the most current data relative to that of the middle and top lines and therefore does not need to be retained in memory for this purpose. Line 30 may also include a nineth bit of parity information which is used to determine if the eight bits of data, i.e., the data word, is valid or defective. Obviously, the substitute value need only be inserted into the data stream of video data when it is determined that the data word for any particular sample is defective or missing. Output lines 40, 42, 44 and 46 from respective memories 1 through 4 are applied to 2-to-1 switches 48 and 50 which are used to select one of the outputs from the memories that are connected to the respective switches and provide the selected data at its output. In this regard, the 2-to-1 switch 48 is connected to receive outputs 40 and 44 from memories 1 and 3, and a control line 52 selects either of these outputs for application to output line 54 which is connected to one input of each of 2-to-1 switches 56 and 58. Similarly, the 2-to-1 switch 50 is connected to receive the output lines 42 and 46 from memories 2 and 4 and a control line 60 selects one of these inputs for application to output line 62 that is also connected to one input of both of the 2-to-1 switches 56 and 58. Control line 64 controls the 2-to-1 switches 56 and 58 and select either the data on lines 54 or 62 for application on their respective lines 68 and 70, which are respectively the top and middle lines of video data. The control of the illustrated 2-to-1 switches as well as the memories are provided by memory and switch control circuitry, indicated generally at 72, which has lines 74 extending to the memories 32–38 for performing the writing and reading operations at the appropriate times and which are controlled by a 17.7 MHz clock signal on line 76 and a horizontal rate signal on line 78.

Successive lines of video data are sequentially written into memories 1 through 4 in numerical order, i.e., the first line is written into memory 1 followed by the second line into memory 2, etc. It should be appreciated that while there are three lines of data that are used at any one time to generate the value for a sample to be corrected, only three lines of memory need actually be provided, but the four separate memories are described herein as a manner of convenient implementation and it should be appreciated that the actual capacity and number of the memories does not in and of itself form a part of the invention and any memory means that is capable of providing the three lines of video data at the proper time is all that is required. While the current data at the input on line 30 is always used as the bottom line video data information by the apparatus of the present invention, each horizontal line of information that is presented at input line 30 is written into one of the memories in the numerical order previously described. The switching of the 2-to-1 switches that receive the data from the memories is adapted to provide the top and middle line information at the appropriate time. Thus, while a particular line of information may be written into memory 1, it is thereafter read out twice, once as middle line information, followed by once as top line information and it is to be understood that the data is the same data, it merely being redefined during the second reading operation, as the lines of video data are sequenced through the apparatus.

In this regard, reference is made to FIG. 8 which shows the sequence of lines being written in numerical order in the memories as shown in FIG. 8(b) as occurring in groups of four lines that are continually updated or sequenced through. As shown in FIGS. 8(c)–8(f), each line that is written into memory is read out as the middle line and becomes top line information at the occurrence of the next line. With respect to a particular line being written into memory 1, as shown in FIG. 8(g), a previous line is read as the top line and then the memory is inactive for one line before it writes in another line of data. After it has written in the new line of data, it immediately reads out the data once as the middle line and again as the top line. The 2-to-1 switches 48, 56 and 58 operate to provide the data at the appropriate output line 70 or 68. Similarly, as shown in FIGS. 8(h), 8(i), and 8(j), each of the second, third and fourth memories operate in a similar manner, by writing in a line followed by reading out the information of that line, first as a middle line and then as a top line of data. It bears repeating that the data is identical when being read out as middle line or top line data, the second time having occurred one line later so that it is redefined as top line information. It should also be appreciated that when a line is being written, it is being written as bottom line information and the bottom line information is provided to the apparatus shown in FIG. 2. Since the output of either memory 1 or 3 is selected by the switch 48 and its output 54 is applied to either one of the switches 56 and 58, it is seen that by appropriately timing the operation of the switches to select the proper output, that the output of any one of the memories can be switched to become either middle line or top line information. The memory and switching control circuitry 72 provides the outputs on lines 52, 60 and 64 to control the 2-to-1 switches so that the appropriate information is present on the output lines 68 and 70 in the proper manner and generally as described with respect to FIG. 8.

The apparatus that performs the arithmetic functions described with respect to FIG. 4, utilizing the data from lines 30, 68 and 70 of FIG. 1 as shown in FIG. 2 and has input lines 68, 30 and 70 that are applied to three input latches 80, 82 and 84. The middle line information on line 70 contains the video data stream in which the corrected samples will be substituted for defective data therein and the data stream is sequenced through the line 70, latch 84, line 86, latch 88, line 90, latch 92, line 94, latch 96, line 98 to a 2-to-1 switch 100 which selects either the data from the data stream 98 or a corrected data word from the other portion of the apparatus. The appropriate output from the 2-to-1 switch 100 is applied onto output line 102, a final output latch 104 and output line 106 which contains the data stream with corrected samples substituted therefor. A drop-out control line 108 selects either the middle line information from line 98 or a corrected data word that is provided by the other portion of the circuitry shown in FIG. 2.

To generate the corrected value, the top and bottom line information present on input line 68 and 30 are stepped through the latches 80 and 82 onto output lines 110 and 112, respectively, which are in turn applied to respective latches 114 and 116 which have respective output lines 118 and 120. Lines 118 and 120 are applied to yet other respective latches 122 and 124, the outputs of which are applied via lines 126 and 128 to respective summation and divide-by-two circuits 130 and 132. Since the three consecutive latches 80, 114 and 122 for the top line have at their respective outputs data words for three consecutive samples, i.e., the output of latch 80 has a T− sample value, the latch 114 has an output value T, and the latch 122 has the output value T+, the three consecutive top line data words are present for use by the apparatus in generating the average value. Similarly, the bottom line information has three consecutive sample values at the outputs of the latches 82, 116 and 124 for use in performing the averaging operation. To generate a corrected or replacement U sample for the sample to be corrected, it can be recalled from FIG. 4 that a T+ value is averaged with a B− value and, in this regard, the T+ value is effectively the output of latch 122 appearing on line 126 which is applied to the averaging circuit 130, together with the B− value which appears on line 112 that is applied to the other input of the circuit 130. Similarly, the generation of a V sample is performed by averaging a T− value with a B+ value (see FIG. 4) and this is accomplished by the averaging circuit 132 which has the T− value appearing on line 110 connected to the averaging circuit 132 together with the B+ value from line 128. Thus, the U replacement values from the averaging circuit 130 appear on line 134 and the V replacement samples appear on line 136 from the output of the averaging circuit 132.

A 2-to-1 switch 138 is controlled by steering logic 140 (clocked by 4 $f_{sc}$ and $f_{sc}$ clocks on lines 139 and 141) via line 142 so that a U replacement value from line 134 is applied to output line 144 when the sample to be corrected is a U sample and, similarly, selects the value on line 136 when the sample to be corrected is a V sample. The output from the 2-to-1 switch 138 appearing on line 144 is gated through a latch 146 onto line 148 that extends to yet another 2-to-1 selector switch 150 which will be controlled by a control line 152 to select the signals on line 148 to be applied to the output 154 whenever the video signal is a color signal as opposed to a black and white or monochrome signal. The signals on line 154 are clocked through a latch 156 onto line 158 which is the other input to the 2-to-1 switch 100 previously mentioned, so that the appropriate corrected value can be inserted into the data stream. It should be appreciated that the circuitry is operative to provide a corrected value on line 158 for virtually every data word that is present in the data stream, but the corrected values are only inserted into the data stream when the drop-out control line 108 is active as a result of detecting a parity error or the existence of a drop-out or the like.

While the foregoing description generally describes the operation of the apparatus when the video information signal is a color signal, the apparatus shown in FIG. 2 is also adapted to provide only luminance correction as would be necessary if the video signal was a monochrome signal. To this end, the outputs from latches 114 and 116 provide the top and bottom values on lines 118 and 120 which are applied to another averaging circuit 160 which provides the averaging shown in FIG. 4 for the luminance axis and the average value appears on output line 162 that is clocked through a latch 164 onto line 166 that extends to the 2-to-1 switch 150 which will be controlled by the line 152 to select the line 166 in the event that a monochrome signal is present.

Circuitry that can be used to carry out the operation of the block diagram of FIG. 2 is shown in FIGS. 10a and 10b which together comprise an electrical schematic circuit diagram for accomplishing this purpose. The reference numbers for the latches, averaging circuits, 2-to-1 switches and the like shown in FIG. 2 are applied to the circuit components of FIGS. 10a and 10b, and since the operation is virtually identical, the circuitry of FIGS. 10a and 10b will not be described in detail. For similar reasons, the specific circuitry which is shown in FIGS. 11a and 11b, and which carries out the operation of the block diagram of FIG. 1 will not be described in detail. One of ordinary skill in the art, when examining the detailed electrical schematic diagrams of FIGS. 11a and 11b, together with the circuitry illustrating the particular memory circuits shown in FIG. 12, coupled with the foregoing general description and viewing the timing diagrams shown in FIGS. 8 and 9, will understand the operation of the circuitry which merely provides three successive lines of video data words that are utilized by other portions of the apparatus of the present invention to provide the substitute or generated value for a sample that is to be corrected. However, reference is made to FIG. 11a which has the input data applied at the upper left portion thereof via lines 30 which extend to the memories 32—38 shown in FIG. 11b. A reset input 170 is also provided as shown at the left of FIG. 11a which extends to a divide-by-two circuit, indicated generally at 172, which provides an output signal at every new frame of video information for the purpose of returning all counters to zero as is appropriate. A counter, indicated generally at 174, provides an output pulse on line 176 after counting through a totle count of 1135 as previously described, it being accomplished by loading the illustrated counter with the load number 2962 which provides an output pulse at the terminal count of 1135 as is desired. This pulse on line 176 occurs every line and resynchronizes the horizontal synchronization which is derived from the subcarrier frequency, the counter 174 being clocked by the 17.7 MHz clock on line 178 as is evident from the drawing. Latches 180 and 182, together with the logic circuitry shown generally at 184 provide the proper timing and control of the memory to carry out the write enable, loading, selection of the appropriate memory and the like to accomplish the operations shown by the timing diagrams of FIGS. 8 and 9 and which have been described hereinbefore.

Line 186 provides an output select signal for selecting one of the memories 32 or 36, a high signal selecting the output of memory 32, whereas a low signal on line 186 selects the output of memory 36. The output of the selected memory appears on line 54. Similarly, a high signal on line 188 will select the output of memory 34 whereas a low signal will select the output of memory 38 which will appear on line 62. The load signals for loading either of memories 1 or 3 are applied via lines 190 and 192 and similar load lines 194 and 196 control the loading of the respective memories 34 and 38. Write enable signals are applied to the memories 32 and 36 (memories 1 and 3) via lines 198 and 200 whereas the write enable signals for memories 34 and 38 (memories 2 and 4) are applied via lines 202 and 204.

With respect to the circuitry shown at the bottom of FIGS. 11a and 11b, indicated generally at 206 and identified as a drop-out generator, this is circuitry for generating a drop-out pulse at output line 108 for the purpose of testing the operation of the apparatus and the circuitry is adapted to provide a drop-out pulse at the proper time so that a substitute value will be inserted into the data stream for any one of the four samples per subcarrier cycle, i.e., $U_a$, $U_b$, $V_a$ and $V_b$, and these are identified by the switches indicated generally at 208. It should be appreciated that drop-out detectors and parity error detectors will be utilized in the commercial apparatus to generate a drop-out pulse at output 108 which will control the 2-to-1 switch 100 to insert the substitute generated value into the data stream of video information as is desired.

Figure 12A:
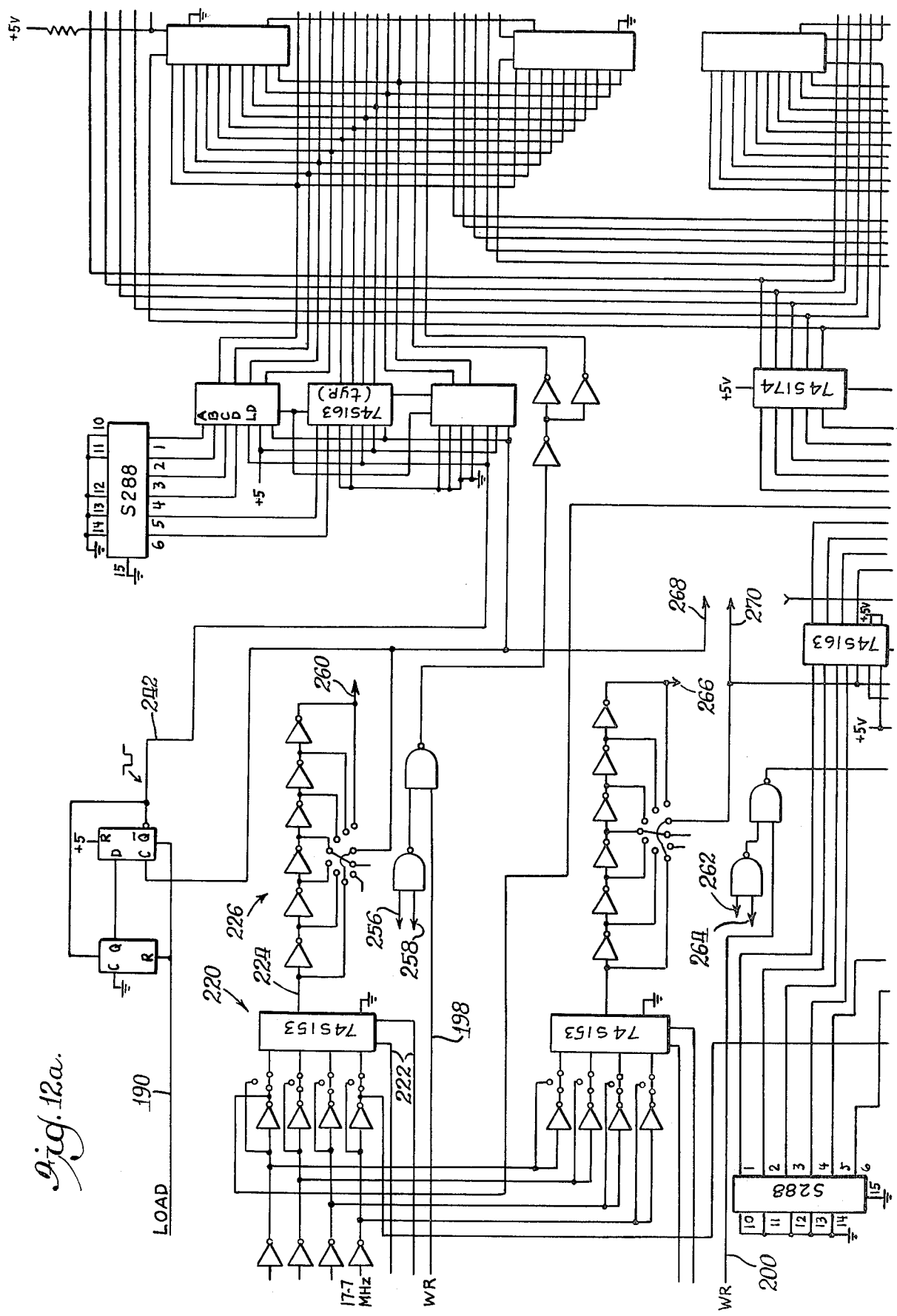
Figure 12D:
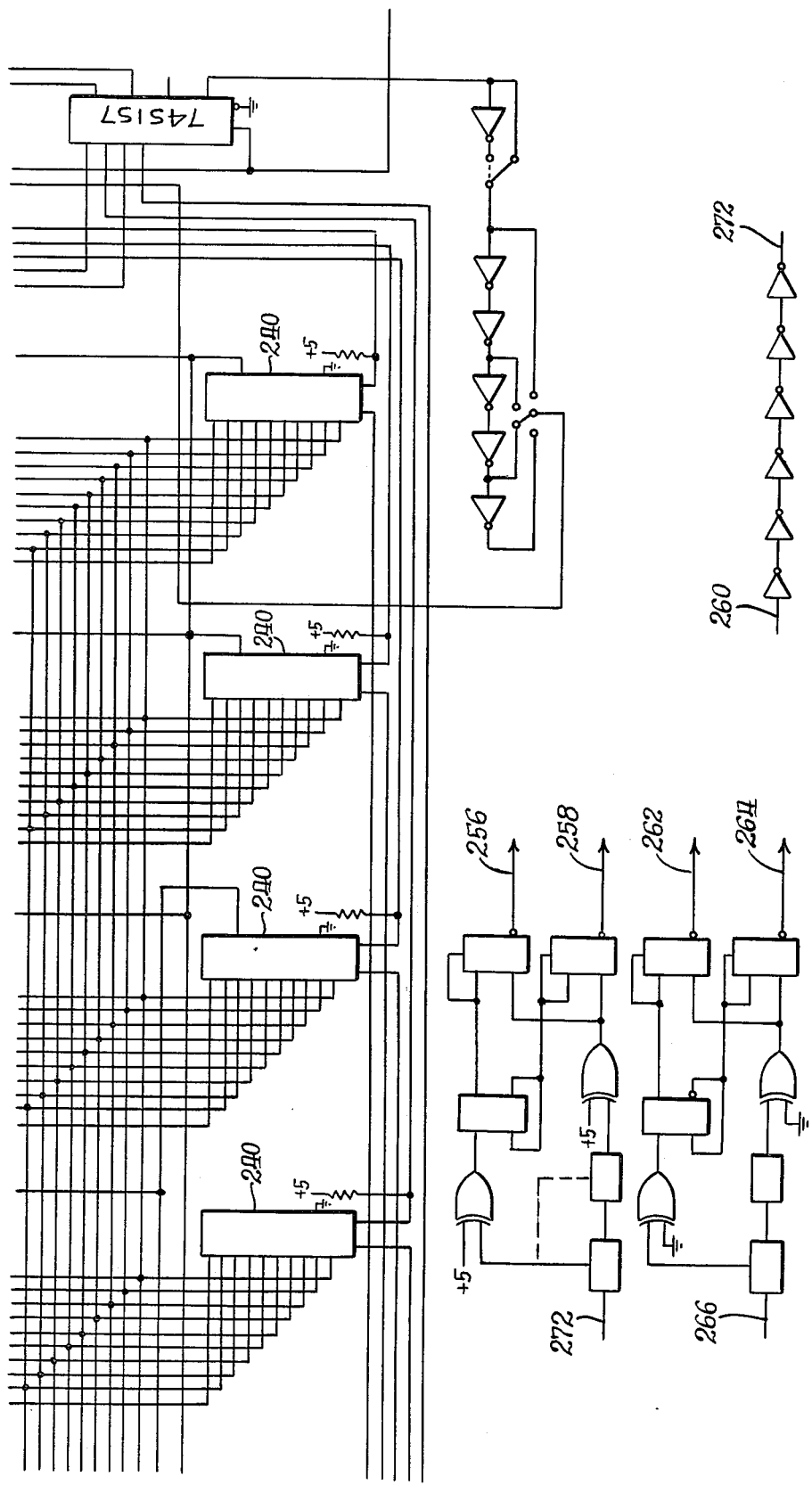

The specific circuitry of the memories 32–38 are shown in FIGS. 12a through 12d, which together comprise one pair of memories and specifically, the memories 32 and 36 are shown in FIG. 12. It should be appreciated that a duplication of this circuitry is included in the apparatus for the memories 34 and 38 and operate virtually identically. The input lines 30, together with the appropriate load signals, output select, write signals and clocks are identified and the operation of the specific circuitry will not be described in detail, except for the following comments. As shown in FIG. 12a at the upper left portion thereof, there are several inputs illustrated which extend to a demultiplexer 220, the address lines 222 of which are set so as to select the 17.7 MHz clock on line 178. Thus, the output line 224 of the demultiplexer 220 has a 17.7 MHz clock which extends through a number of inventors, indicated generally at 226, which together with a jumper 228, provide the proper phase and timing of the 17.7 MHz signal for use elsewhere in the circuitry. The use of this type of delay occurs elsewhere in the circuitry shown in FIG. 12 and is used generally for the same purpose, i.e., to provide the appropriate timing and phase of the clocks. Referring to the lower portion of FIG. 12a, there are two 2-to-1 switches 230 that are set to pass the signals on lines 30 therethrough which are applied via lines 232 to a pair of latches 234 and 236 which latch the data for writing into the individual memory circuits 238 associated with the memory 32 or circuits 240 associated with the memory 36. The integrated circuits are preferably either Fairchild No. 91415A or Intel Model No. 2115A random access memories. The address generators for the memories are identical for both the upper and lower memories and only the upper one will be briefly described. The load signal on line 190 is applied to a pair of D flip-flops which together provide a negative-going output pulse on line 242 which is applied to a counter, indicated generally at 244, which loads the counter to a predetermined address determined by a programmable read only memory 246 that is set to load the counter 244 at a preset number. The clock then clocks the address generator to access the memories sequentially through the addresses, the clock being at a 17.7 MHz rate. The outputs from the memories 238 appear on lines 40 as previously described with respect to the block diagram of FIG. 1 and these are applied to a 2-to-1 switch 48 which selects either the outputs of memory 32 or the outputs of memory 36 and the 2-to-1 switch 48 has output lines 250 which extend to a latch 252, the outputs of which are lines 54, as also shown in the block diagram of FIG. 1. The other lines 256, 258, 260, 262, 264, 266, 268 and 270 shown in FIG. 12a are connected to correspondingly numbered lines in FIG. 12d. Lines identified as 272 in FIG. 12d are interconnected. A 2-to-1 switch 274 is set to select input lines 106 and inputs 276 for application to the outputs 278.

From the foregoing detailed description, it should be appreciated that an improved apparatus has been shown and described for generating substitute or corrected values for data words representing individual samples of a PAL format video information signal. The apparatus has advantages over prior art schemes for generating replacement values in that it utilizes other samples in close proximity to the location of the sample to be corrected for generating an average value that can be inserted into the location where the defective sample is located. By utilizing the averaging technique, extremely accurate information can be generated which has a high probability of providing a value that accurately represents the sample that is defective. This is true even if the video image is one in which fast motion is occurring and is also true where a distinct change in contrast or color may occur very close to the location of the sample that is to be corrected. If a significant change in color or luminance occurs, then the averaging technique will result in a neutral or intermediate value which is less noticeable than either the insertion of an extremely dark value for what should be a light value or the converse. The averaging technique employed by the apparatus of the present invention also provides a luminance value inherent in the averaging which is also very accurate for the same reasons that have been discussed. The utilization of the relatively small amount of memory capacity in accomplishing the correction results in relatively less cost than many apparatus that have previously been employed, some of which require a full field of memory capacity, which in the case of a PAL format video information signal requires memory capacity for approximately 312 lines.

Although particular embodiments of the present invention have been illustrated and described, various modifications, substitutions and alternatives will be apparent to those skilled in the art, and accordingly, the scope of the invention should be defined by the appended claims and equivalents thereof.

Various features of the invention are set forth in the following claims.

What is claimed is:

1. Apparatus for providing substitute digital data words in a stream of digital data word samples representing a video information signal of a PAL television format that has been digitally sampled alternately along the U and V axes to produce U and V data word samples at a rate of four times the chrominance subcarrier frequency, comprising:

means for receiving and storing said video data word samples from at least three successive horizontal video lines;

means operatively coupled to said storing means for generating a substitute data word sample for any defective one of said U and V samples, a U sample being generated by averaging the value of the immediately preceding U sample from the adjacent preceding horizontal line and the immediately succeeding U sample from the adjacent succeeding video line, a V sample being generated by averaging the value of the immediately succeeding V sample from the adjacent preceding video line and the immediately preceding V sample from the adjacent succeeding video line;

switching means for providing one of said generated samples at the output in response to an activating signal being received.

2. Apparatus as defined in claim 1 including control means for controlling the writing and reading of said video data word samples into and out of said storing means and for providing a generated U sample at the output of said apparatus when the defective data word sample is a U sample and for providing a generated V sample at the output of said apparatus when the defective data word sample is a V sample.

3. Apparatus as defined in claim 2 wherein said storing means comprises a plurality of digital memory means, each having a capacity of digital data word samples for at least one horizontal line, said control means controlling the selective writing and reading of data word samples into and from said digital memory means.

4. Apparatus as defined in claim 3 wherein said control means further comprises switching means operatively connected to said memory means to simultaneously provide a plurality of successive digital data word samples from identical locations in three consecutive horizontal video lines.

5. Apparatus as defined in claim 4 wherein said memory means comprises at least four digital memories, said control means controlling said memories so that one of said memories writes the incoming video data word samples for a horizontal video line while reading the data word samples from two horizontal video lines from selected ones of the other three memories.

6. Apparatus as defined in claim 1 wherein each of said U and V sample generating means comprises a plurality of latches for receiving three consecutive data word samples from the preceding horizontal video line and the succeeding horizontal video line relative to the horizontal video line in which a substitute sample is being generated therefor, and means for receiving said data word samples and for summing the values of the two samples and dividing by two to thereby obtain the value of the generated sample.

7. Apparatus as defined in claim 5 wherein said switching means comprises a 2-to-1 switching means connected to each of a pair of said memories, each of said 2-to-1 switching means being adapted to select one memory of each pair of memories and apply its output to one input of each of a second pair of 2-to-1 switching means, the output of each of said second pair of 2-to-1 switching means being thereby adapted to provide the output of any one of the four memories.

8. Apparatus as defined in claim 1 including means operatively coupled to said storing means for generating a substitute data word sample for a defective monochrome sample, said monochrome sample being generated by averaging the values of the samples from the corresponding location in the adjacent preceding and succeeding horizontal video lines, and supplemental switching means for applying said generated monochrome samples to said switching means in response to a monochrome indicating signal being applied to said supplemental switching means.

9. Apparatus as defined in claim 1 wherein said storing means and said switching means are respectively adapted to store and switch data word samples having at least eight bits.

10. Apparatus for generating substitute sample values for defective data word samples and for inserting the same in a data stream of digital data word samples, wherein the samples are alternately taken along the U and V vector axes at a sampling rate of four times the chrominance subcarrier component frequency of a PAL format video information signal, comprising:

means for generating a U data word sample value including means for averaging the values of the immediately preceding in time data word sample from the preceding horizontal video line and the immediately succeeding sample from the succeeding horizontal video line, the generated U sample value being provided at the output of said U sample generating means;

means for generating a V data word sample value including means for averaging the values of the immediately succeeding sample from the preceding horizontal video line and the immediately preceding sample from the succeeding horizontal video line, the substitute V sample value being provided at the output of said V sample generating means;

means for selecting one of the outputs of either the U or V sample generating means for insertion into the data stream so that a generated V sample value is substituted for a defective V sample and a generated U sample value is substituted for a defective U sample.

11. A method of generating substitute sample values for defective data word samples in a data stream of digital data word samples which are alternately taken along the U and V vector axes at a sampling rate of four times the chrominance subcarrier component frequency of a PAL format video information signal, comprising the steps of:

generating a substitute U data word sample value by averaging the values of the immediately preceding in time U data word sample from the preceding horizontal video line and the immediately subsequent in time U sample from the succeeding video horizontal line and providing the generated U sample value at the output thereof;

generating a substitute V data word sample value by averaging the values of the immediately succeeding in time V sample from the preceding horizontal line and the immediately preceding in time V sample from the succeeding line and providing the substitute V sample value at the output thereof;

selecting one of either the V or U generated sample values for insertion into the data stream so that a generated V sample value is substituted for a defective V sample and a generated U sample value is substituted for a defective U sample.

12. A method as defined in claim 11 including the step of receiving and storing the video data word samples from at least three successive horizontal video lines and for providing said samples for use in generating said substitute samples.

13. A method of generating substitute data word samples for defective data word samples in a data stream of digital samples which are taken from a PAL format video information signal and which are taken alternately along the U and V vector axes thereof at a sampling rate of four times the chrominance subcarrier component frequency of the video information signal, comprising the steps of:

receiving and storing data word samples from at least three consecutive horizontal video lines;

generating a substitute U data word sample for a defective U sample by averaging the values of the immediately preceding sample from the preceding horizontal line and the immediately succeeding sample from the succeeding horizontal line;

generating a substitute V data word sample for a defective V sample by averaging the values of the immediately succeeding sample from the preceding horizontal line and the immediately preceding sample from the succeeding line;

inserting a generated substitute U sample into the data stream at the location of a defective U sample and inserting a generated substitute V sample into the data stream at the location of a defective V sample.

* * * * *